United States Patent
Jackson et al.

(10) Patent No.: US 9,986,684 B2
(45) Date of Patent: Jun. 5, 2018

(54) EASY PUSH LAWNMOWER WITH LARGE BLADE AND GEAR REDUCTION

(71) Applicant: GXi Holdings, LLC, Fort Worth, TX (US)

(72) Inventors: Gordon W. Jackson, Clayton, NC (US); William R. Best, Dudley, NC (US)

(73) Assignee: GXI Holdings, LLC, Fort Worth, TX (US)

( * ) Notice: Subject to any disclaimer, the term of this patent is extended or adjusted under 35 U.S.C. 154(b) by 94 days.

(21) Appl. No.: 14/964,004

(22) Filed: Dec. 9, 2015

(65) Prior Publication Data
US 2017/0164553 A1    Jun. 15, 2017

(51) Int. Cl.
*A01D 34/76* (2006.01)
*A01D 34/81* (2006.01)
*A01D 101/00* (2006.01)

(52) U.S. Cl.
CPC ............. *A01D 34/76* (2013.01); *A01D 34/81* (2013.01); *A01D 2101/00* (2013.01)

(58) Field of Classification Search
CPC .... A01D 34/76; A01D 34/81; A01D 2101/00; A01D 34/00–34/905; A01D 2034/645–2034/907; A01D 34/6806
See application file for complete search history.

(56) References Cited

U.S. PATENT DOCUMENTS

| | | | | |
|---|---|---|---|---|
| 2,329,372 A | * | 9/1943 | Hitch | A01D 34/6806 180/19.1 |
| 2,552,583 A | * | 5/1951 | Phelps | A01D 34/6806 172/15 |
| 3,888,072 A | * | 6/1975 | Templeton | A01D 34/63 56/13.4 |
| 4,090,346 A | * | 5/1978 | Doi | A01D 34/685 56/13.6 |
| 4,129,977 A | * | 12/1978 | Comer | A01D 34/71 56/13.4 |
| 4,583,504 A | * | 4/1986 | Morris | A01D 34/6806 123/195 R |
| 5,012,633 A | * | 5/1991 | Ito | A01D 43/077 56/12.9 |
| 5,044,146 A | * | 9/1991 | Nakamura | A01D 34/404 56/11.3 |
| 5,127,215 A | * | 7/1992 | Wenzel | A01D 34/6806 180/19.1 |
| 5,402,628 A | * | 4/1995 | Minamoto | A01D 34/81 56/17.1 |
| 5,606,944 A | * | 3/1997 | Kurihara | F02B 63/02 123/195 HC |

(Continued)

OTHER PUBLICATIONS

Lawn mower, Wikipedia, http://en.wikipedia.org/wiki/Lawn_mower, Dec. 19, 2012.

(Continued)

*Primary Examiner* — Alicia Torres
*Assistant Examiner* — Adam J Behrens
(74) *Attorney, Agent, or Firm* — James G. Passé; Passé Intellectual Property, LLC

(57) ABSTRACT

A system for providing larger blades on a lawnmower, while at the same time allowing the lawnmower to be easily handled. This is accomplished while maintaining legal rpm speeds for the cutting blade.

8 Claims, 4 Drawing Sheets

(56) References Cited

U.S. PATENT DOCUMENTS

| | | | | |
|---|---|---|---|---|
| 5,873,225 A * | 2/1999 | Schaedler | ............ | A01D 43/077 56/13.3 |
| 5,894,715 A * | 4/1999 | Braun | ................ | A01D 34/6806 56/11.9 |
| 6,076,265 A * | 6/2000 | Huang Lo | ............... | A01D 34/76 30/265 |
| 7,958,710 B2 | 6/2011 | Gilpatrick et al. | | |
| 8,215,091 B2 * | 7/2012 | Fox | ........................ | A01D 34/76 56/17.5 |
| 2003/0163981 A1 * | 9/2003 | Osborne | ................ | A01D 34/81 56/320.1 |
| 2004/0163373 A1 * | 8/2004 | Adams | ................... | A01D 34/78 56/10.2 R |
| 2006/0162310 A1 * | 7/2006 | Dittmer | ................ | A01D 34/005 56/289 |
| 2008/0209879 A1 * | 9/2008 | Fox | ........................ | A01D 34/76 56/10.3 |
| 2014/0196425 A1 * | 7/2014 | Lewis | ................... | H02J 7/0068 56/16.7 |
| 2014/0230394 A1 * | 8/2014 | Zerbarini | ............... | A01D 34/52 56/16.7 |
| 2016/0073580 A1 * | 3/2016 | Scrivner | ............. | A01D 34/006 701/50 |
| 2016/0219788 A1 * | 8/2016 | Jiang | ...................... | A01D 69/08 |

OTHER PUBLICATIONS

"New Exmark Metro 26 "Commercial Self Propel Lawn Mower", eBay, http://ww.ebay.com/itm/New-Exmark-Metro-26-Commercial-Self-Propel-Lawn-Mower . . . ", May 31, 2013.

* cited by examiner ized with the center of gravity behind the center of the blade housing (e.g. the driveshaft positioned directly behind the output shaft and the back of the housing), that a larger cutting blade can be utilized with a higher horsepower motor. And, at the same time, the shift in weight makes the lawnmower easier to push, shares a common oil bath, reduces the size and weight of the lawnmower engine and makes the lawnmower cheaper to make than other large blade mowers.

EASY PUSH LAWNMOWER WITH LARGE BLADE AND GEAR REDUCTION

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to lawnmowers and, particularly, to a lawnmower with a gear-reduced engine, larger blade and easy handling configuration.

Description of Related Art

The home hand lawnmower is typically an engine powered lawnmower consisting of a 2 or 4 stroke engine, having a cutting blade in a housing enclosure driven by the engine crank shaft. For safety reasons, in the home lawn cutting market, legislation in the US limits the tip speed of the cutting blade to a maximum of 19,000 feet/minute, which in turn limits the engine crank shaft speed to 3,400 rpm with the largest available legal blade being 21 inches at this speed. Some larger blades are available but utilize much lower speeds. The horsepower on a lawnmower is a direct function of the rpm of the crankshaft so that power obtainable from a given motor with a 21 inch blade is limited, no matter how powerful the engine is, and the 21 inch lawnmower blade has been the largest available cutting blade on home lawnmowers for decades.

A problem with home lawnmowers is the fact that the ability to maneuver the lawnmower by hand is a function of the weight of the lawnmower, as well as the enclosure, motor, and blade. Typically, the motor is balanced dead center, with the shaft in the middle of the housing. For a typical 21 inch blade, this is well-balanced and weighted for the average user. However, larger commercial lawnmowers with higher horsepower motors and larger blades are proportionally heavier and this makes it difficult for many smaller home owners to handle anything larger than the motors with a 21 inch blade. Push commercial lawnmowers, such as, for example, the Esmark Metro 26 inch blade push mower, have very tall and heavy engines, and are difficult to maneuver. In addition, they are costly compared to home lawnmowers. Since mowers like the Esmark Metro 26 are all that has been available for decades, the weight has not been a problem with commercially available home lawnmowers.

The fact is, the larger a blade is, the quicker one can finish cutting a lawn, since the cutting path is larger with the larger blade. So, while there is every reason to have a larger cutting blade, to date no one has solved the problem of a larger cutting blade where the lawnmower is as easy to handle by hand as a smaller blade, yet still meets U.S. Federal regulations regarding blade tip speed, and is cost effective to produce. There has been a long standing need for a way to manufacture a lawnmower with a blade larger than 21 inches that can easily be handled and inexpensive.

BRIEF SUMMARY OF THE INVENTION

The present invention relates to the discovery that if a lawnmower motor driveshaft is geared down by rotational attachment to a secondary output shaft, and the motor positioned with the center of gravity behind the center of the blade housing (e.g. the driveshaft positioned directly behind the output shaft and the back of the housing), that a larger cutting blade can be utilized with a higher horsepower motor. And, at the same time, the shift in weight makes the lawnmower easier to push, shares a common oil bath, reduces the size and weight of the lawnmower engine and makes the lawnmower cheaper to make than other large blade mowers.

In one embodiment, the present invention relates to a lawnmower having a blade housing with a back and center, and an engine with a vertical rotating crankshaft in a crank case driven by the engine and having a single oil bath disposed in the crank case comprising:

a) a vertical rotating output shaft driven by a rotational connection to the crankshaft which drives the output shaft at a slower rotational speed than the vertical crankshaft rotational speed, wherein the vertical output shaft is positioned in the center of the blade housing and drives a cutting blade wherein the rotational connection and crank shaft are positioned in the crank case and share the single oil bath with the crankshaft;

b) the engine position on the blade housing such that the center of gravity of the engine is positioned between the center and back of the blade housing; and c) a cutting blade driven rotationally by the vertical output shaft.

DETAILED DESCRIPTION OF THE INVENTION

Figure 1A:
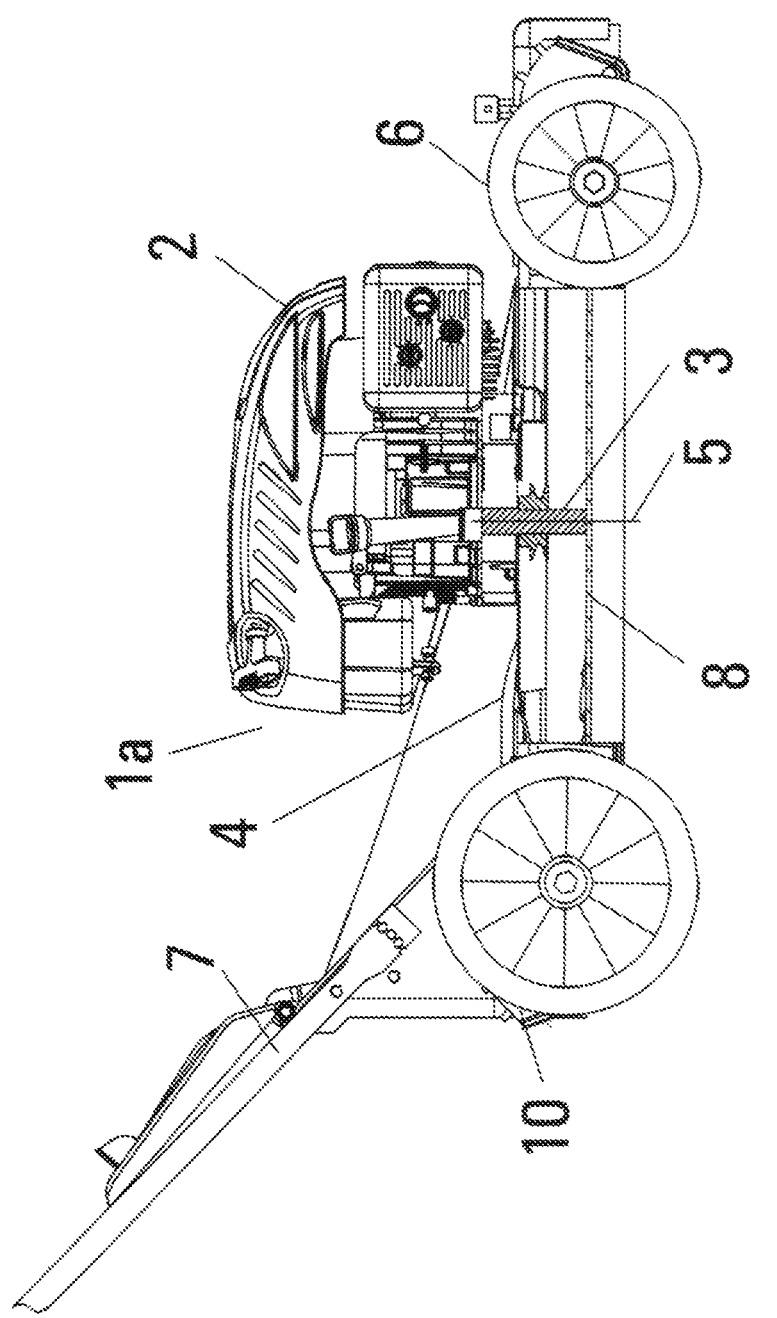
FIGS. 1a and 1b is a cutaway side view of the prior art lawnmowers and the lawnmower of the present invention.

While this invention is susceptible to embodiment in many different forms, there is shown in the drawings, and will herein be described in detail, specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

References throughout this document to "one embodiment", "certain embodiments", and "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitations thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

Figure 1B:
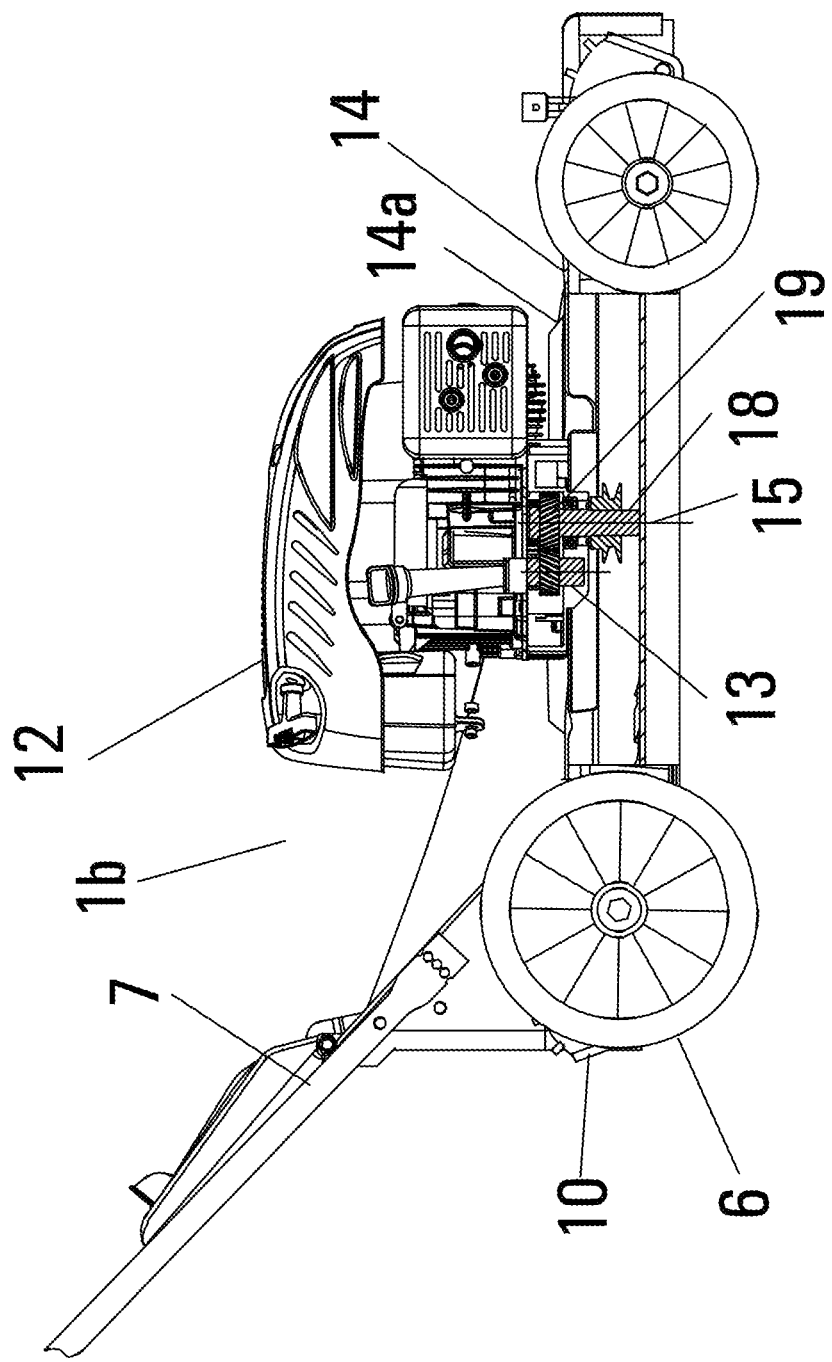

As used herein a "lawnmower" is a direct drive, clutch or clutchless type lawnmower comprising a handle for pushing and/or steering the lawnmower, wheels, cutting blade and motor, of the type shown in the FIGS. 1a and 1b herein. They comprise a horizontal rotary blade spun by use of a gasoline powered 2 or 4 stroke motor (or the like equivalent motor) driving a vertical driveshaft (e.g. one that is vertically spinning downward) which spins the vertical output shaft which in turn spins the cutting blade horizontally. The vertical crankshaft is positioned in a crankcase containing a single oil bath.

The cutting blade is housed in the "blade housing", also known as the cutter deck housing. The blade housing contains the horizontal rotary cutting blade and, where necessary, the drive system of the motor. It is usually shaped not much larger than the size of the cutting blade to allow a "just enough" type fit of the blade in the blade housing. The blade housing has a center, which is where the center of the blade is mounted to whatever motorized shaft is spinning the cutting blade. In the present invention, the output shaft spins the cutting blade and the output shaft is positioned at the center of the housing as shown in FIGS. 1a and 1b. The blade housing also has a rear, or the back most portion of the housing, facing toward the user when the lawnmower is pushed or steered. Typically, lawnmowers of the prior art are balanced such that the balance point of the motor and all the weight of the deck housing is over the center of the deck housing for the purpose of tipping prevention. In the present invention, balance of the motor is behind the center point of the deck housing and in front of the back of the deck housing. In one embodiment, the center of gravity is directly in the back of the center of the housing, thus weighting the lawnmower's center of gravity behind the center. It has been determined that while this changes balance of the lawnmower from an evenly balanced state, as is done in previous lawnmowers, it leads to a lawnmower that is easier to push when a heavier more powerful engine is utilized with a larger blade. As used herein, the cutting blade, in one embodiment, is greater than 21 inches and, in one embodiment, 26 inches or longer.

In order to drive a larger blade than the standard 21 inch blade on a lawnmower, the lawnmower motor drives a downwardly disposed rotating output shaft driven by a rotational gearing connection to the crankshaft. As used herein, a "rotational connection" can be done by any mechanical means, such by rotational gears, planetary gearing, timing chain, timing belt and the like. Effectively, this connection makes a connection simulating or actually going from one gear size to another. Rotational directing of the output shaft (clockwise or counterclockwise) is determined by the rotational connection made. When gears are utilized, this can be done by sets of meshing gearing teeth, each rotating on their respective rotating shaft. The size of the selected gearing is such that the crankshaft drives the output shaft at a slower rotational speed than the crankshaft rotational speed. So, while in the typical 21 inch blade lawnmower the driveshaft rotates at 3400 rpm, in one embodiment, the crankshaft rotates at 3600 rpm (delivering more power) and the gearing is such that the output shaft is rotating at 2800 rpm driving a 26 inch blade with its tip at 1900 ft/min; other connections are within the skill of the art in view of the rotational connection, the output shaft and crankshaft are all positioned within the crank case and, thus, share a single oil bath rather than multiple oil baths for other large blade mowers. This allows for a lowering of the overall size of the engine, weight of the engine, and number of the parts to the invention, thus reducing the production cost, giving better balance to the large blade lawnmower, and generally improving the performance of a large blade mower, i.e. blades greater than 21 inches.

In the installation of the output shaft, while the rotational connection from the driveshaft drives the output shaft, there is, in one embodiment, a top stop which rests on the body of the motor or on other housing to keep the output shaft from moving lower from gravity. Similar stops could be used to prevent upward movement of the output shaft. As noted above, the output shaft is centered in the blade housing and the driveshaft behind it, in one embodiment, directly behind it. The housing can be made taller and can also be undercut in order to make room for the gearing between the driveshaft and the output shaft.

Now referring to the drawings, FIGS. 1a and 1b are cutaway side views of the prior art lawnmowers (FIG. 1a) and the lawnmower of the present invention (FIG. 1b) for comparison purposes. In FIG. 1a, a standard lawnmower 1a is shown with motor 2 having driveshaft 3 driving blade 8 in the middle 5 of blade housing 4 which centers the weight of the motor in the middle of blade housing 4. Other parts of the lawnmower are also shown; wheels 6, handle 7 and rear of housing 10.

In FIG. 1b there is a cutaway view of the driveshaft and output drive of the present invention lawnmower 1b. Motor 12 has driveshaft 13 which drives output shaft 18 via gears 19. In this embodiment, the output shaft 18 is centered in the middle 15 of the housing 14, with the driveshaft 13 positioned between the output shaft 18 and rear of housing 10. This shifts the weight of the housing 14 behind the middle 15 of the housing 14. The housing 14 has raised area 14a for accommodating the gearing 19.

Figure 2:
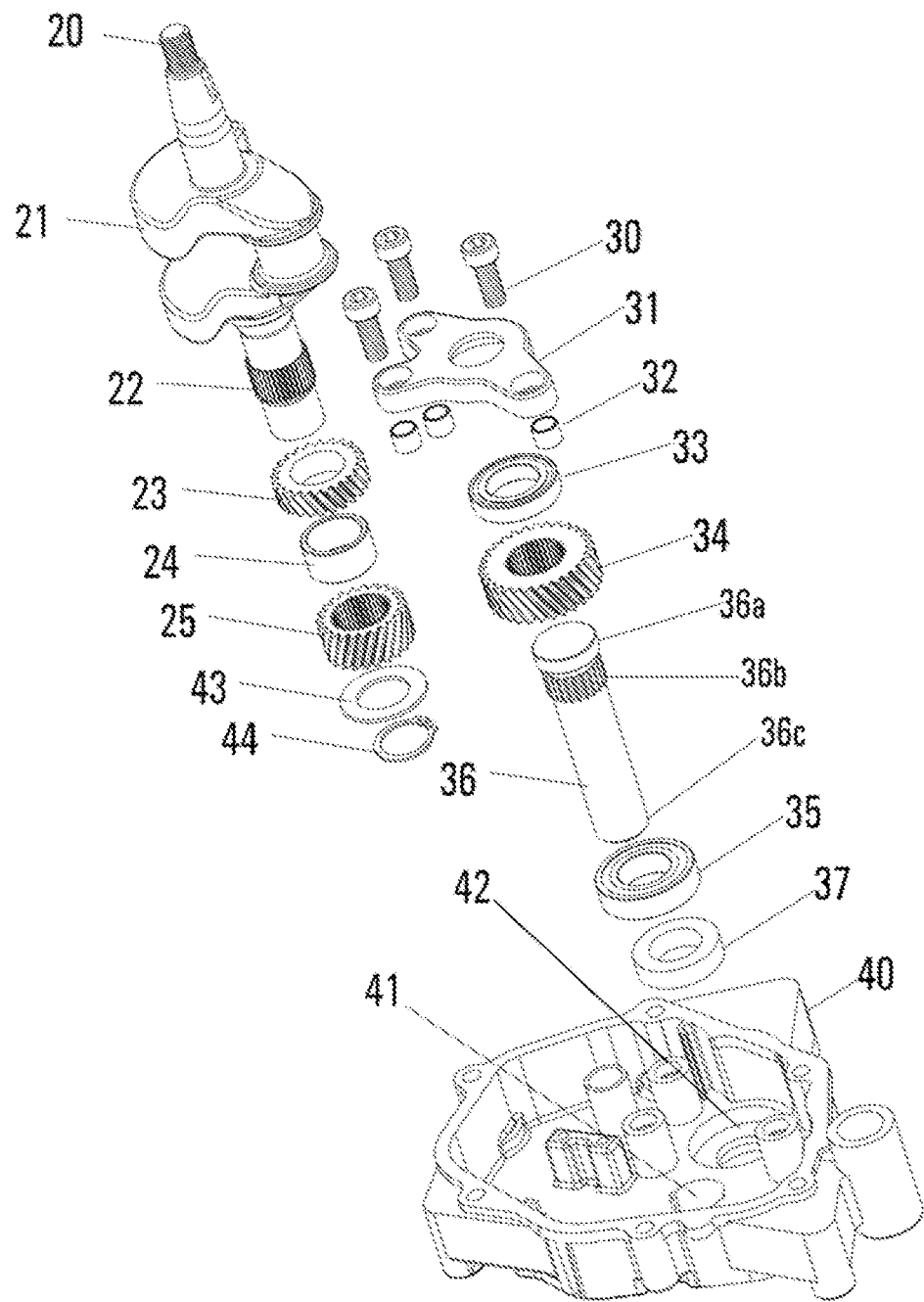
FIG. 2 is an exploded view of the driveshaft and output drive of the present invention.

FIG. 2 is an exploded view of the driveshaft and output drive of the present invention. It is shown horizontally for conveniences but in practice both output shaft and crankshaft are parallel to one another and vertical to the horizontal plane of the lawnmower body.

The main crankshaft 21 of the motor has motor connection 20 and is externally splined 22. The crankshaft 21 is further fitted with a camshaft gear 23 a spacer 24 followed by an internally spline crankshaft driving gear 25 which fits on the externally splined gear 22 and separated from the camshaft gear 23 by the spacer 24. The driving gear 25 is the gear that is mated to the output shaft 36 and drives it. Thrust washer 43 and snap ring 44 are shown and are used to return the assembly; the gearing between the two is such that the output shaft 36 is driven at a slower rpm than the crankshaft 21, as explained above. The crankshaft 21 fits into bottom cover 40 at hole 42.

The output shaft 36 consists of bearing bolts 30, which thread through the bearing cap 31 and eventually screw into the bottom cover 40 the engine. Alignment bushing 32 is used to support and align the upper ball to the output shaft 36 and bottom cover 40. The output shaft 36 is supported at two points—an upper output bearing 33 (ball or journal bearings or the like) is the first support part which is fitted in the bearing cap 31. An internally splined output shaft gear 34 mates with the crankshaft driving gear 25 for driving of the output shaft 36 at the proper rpm. A lower output shaft bearing 35 (again ball or journal bearings or the like providing the second support) is fitted underneath the output gear 34. The output shaft 36 is fitted with external splines 36b designed to accept the internally splined output shaft gear 34. The output shaft 36 also has a step 36a which prevents the output shaft 36 from falling out the bottom of the bottom cover 40.

Finally, an oil seal 37 allows the output shaft 36 to mate up to the bottom cover 40 into main crank shaft hole 41. A cutting blade not shown is then fitted onto the end 36c of output shaft 36.

Figure 3:
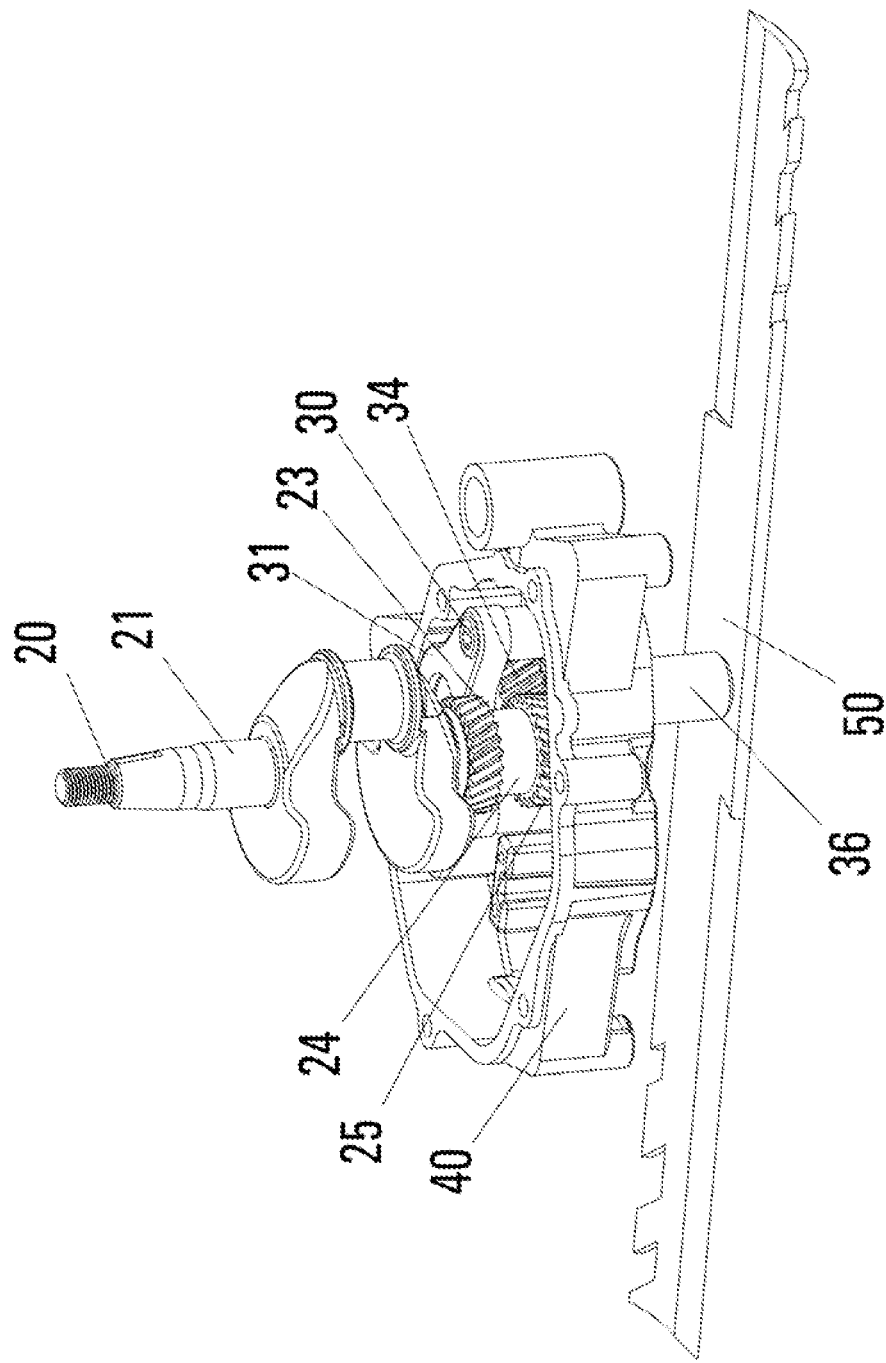
FIG. 3 is a cutaway view of the driveshaft and output shaft attached to the cutting blade.

In FIG. 3 we see the assembled crankshaft 21 connected to the output shaft 36 connected by gears 25 and 34 and driving the cutting blade 50. The crankshaft 21 in this embodiment is positioned behind the output shaft 36, as shown in FIG. 1b, wherein the crankshaft 21 is in between the middle of the blade housing and the rear of the blade housing. The placement of the center of gravity of the motor behind the center of the blade housing instead of over the center of the housing allows for a smaller person to handle the larger blade, e.g. a 26 inch blade, without the problems of weight created by placing the center of gravity in the center of the housing.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A lawnmower having a blade housing with a back, center, and a raised top, and an engine with a vertical rotating crankshaft in a crank case driven by the engine and having a single oil bath disposed in the crank case, the lawnmower comprising:
    a) a vertical rotating output shaft driven by a rotational connection to the crankshaft, which drives the output shaft at a slower rotational speed than the vertical crankshaft rotational speed, wherein the vertical output shaft is positioned in the center of the blade housing and drives a cutting blade with a length of at least 26 inches, wherein the rotational connection and crankshaft are positioned in the crank case, which is positioned beneath the raised top, and wherein the crankshaft shares the single oil bath with the rotational connection in the crank case and wherein there is a step on the output shaft that prevents the output shaft from sliding through a gear and a bottom cover of the crank case;
    b) the engine positioned on the blade housing such that a center of gravity of the engine is positioned between the center and back of the blade housing; and
    c) wherein the cutting blade is driven rotationally by the vertical output shaft.

2. The lawnmower according to claim 1 wherein the motor is an internal combustion motor.

3. The lawnmower according to claim 1 wherein the vertical crankshaft rotates at about 3600 rpm and the output shaft rotates at about 2800 rpm.

4. The lawnmower according to claim 1 wherein a tip of the cutting blade is rotating at a speed of about 19,000 ft./min.

5. The lawnmower according to claim 1 wherein the crankshaft is positioned in-between the vertical output shaft and the rear of the blade housing.

6. The lawnmower according to claim 5 wherein the crankshaft is positioned directly behind the vertical output shaft in-between the vertical output shaft and the rear of the blade housing.

7. The lawnmower according to claim 1 having a rotational gear connection between the crankshaft and output shaft.

8. The lawnmower according to claim 1 which further comprises the output shaft being supported by an upper and lower bearing.

* * * * *